United States Patent
Tosco et al.

(10) Patent No.: US 9,840,174 B2
(45) Date of Patent: Dec. 12, 2017

(54) SEAT BACKREST FOR A MOTOR VEHICLE

(71) Applicant: C.R.F. Societa' Consortile Per Azioni, Orbassano (IT)

(72) Inventors: Franco Tosco, Orbassano (IT); Giorgio Luigi Masoero, Orbassano (IT); Alberto Caruso, Orbassano (IT); Stefano Bernard, Orbassano (IT); Ivan Emanuel Murru, Orbassano (IT); Maurizio Giani, Orbassano (IT)

(73) Assignee: C.R.F. Societa' Consortile per Azioni, Orbassano (IT)

(*) Notice: Subject to any disclaimer, the term of this patent is extended or adjusted under 35 U.S.C. 154(b) by 12 days.

(21) Appl. No.: 15/095,869

(22) Filed: Apr. 11, 2016

(65) Prior Publication Data

US 2016/0297339 A1    Oct. 13, 2016

(30) Foreign Application Priority Data

Apr. 10, 2015 (EP) .................................. 15163285

(51) Int. Cl.
  *A47C 7/02* (2006.01)
  *B60N 2/68* (2006.01)
  *B60N 2/58* (2006.01)

(52) U.S. Cl.
  CPC ........... *B60N 2/682* (2013.01); *B60N 2/5841* (2013.01); *B60N 2/686* (2013.01)

(58) Field of Classification Search
  CPC .......... B60N 2/68; B60N 2/682; B60N 2/686; A47C 7/425; A47C 4/06; A47C 4/30; A47C 31/02

USPC ........... 297/452.18, 452.13, 452.38, 230.11, 297/440.22, 440.11, 440.12
  See application file for complete search history.

(56) References Cited

U.S. PATENT DOCUMENTS

| | | | | |
|---|---|---|---|---|
| 3,175,269 A * | 3/1965 | Raduns | .................. | A47C 7/024 160/383 |
| 3,300,251 A * | 1/1967 | Helms | ...................... | A47C 3/12 297/218.5 |
| 3,844,612 A * | 10/1974 | Borggren | .................. | A47C 5/06 297/440.11 |
| 6,048,033 A * | 4/2000 | Sakurai | ..................... | B60N 2/68 297/361.1 |
| 6,378,944 B1 * | 4/2002 | Weisser | .................. | A47C 7/282 160/369 |
| 7,017,254 B2 * | 3/2006 | Guillot | ..................... | A47C 7/30 29/469.5 |

(Continued)

FOREIGN PATENT DOCUMENTS

| | | |
|---|---|---|
| EP | 2 546 099 A1 | 1/2013 |
| EP | 2 487 065 B1 | 7/2014 |
| WO | WO 2014/063838 A1 | 5/2014 |

*Primary Examiner* — Jose V Chen
(74) *Attorney, Agent, or Firm* — Blank Rome LLP

(57) ABSTRACT

A seat backrest for a motor vehicle has a structure, which supports a padding covered by a cover; the structure has a rear plate provided with a coupling portion, to which an end of the cover is fixed along a peripheral edge of the plate itself; the plate is fixed to a front frame by means of a snap-on connecting device having a plurality of deformable appendages, which are carried by the plate in positions that are spaced apart from one another; the appendages are part of respective brackets, which are fixed to the plate and have respective stiffening portions, which are arranged at the coupling portion.

8 Claims, 2 Drawing Sheets

(56) References Cited

U.S. PATENT DOCUMENTS

| | | | | |
|---|---|---|---|---|
| 7,040,834 B2 * | 5/2006 | Nardi | A47C 31/023 297/440.11 |
| 7,066,550 B1 * | 6/2006 | Su | A47C 31/023 297/440.22 |
| 7,222,915 B2 * | 5/2007 | Philippot | B60N 2/70 297/216.13 |
| 7,425,039 B2 * | 9/2008 | Lin | A47C 31/023 297/452.56 |
| 7,905,550 B2 * | 3/2011 | Weber | B60N 2/686 297/452.1 |
| 8,109,576 B2 * | 2/2012 | Lin | A47C 7/282 297/452.13 |
| 8,251,454 B2 * | 8/2012 | Tsukiji | A47C 7/282 297/219.1 |
| 8,864,239 B2 * | 10/2014 | Michalak | B60N 2/686 297/452.18 |
| 8,888,176 B2 * | 11/2014 | Kaku | B60N 2/4235 297/216.13 |

\* cited by examiner

SEAT BACKREST FOR A MOTOR VEHICLE

The present invention relates to a seat backrest. In particular, the present invention relates to a backrest of a rear seat of a motor vehicle.

BACKGROUND OF THE INVENTION

As it is known, the rear seats of motor vehicles define the front surface of the luggage compartment and must therefore be sufficiently robust to withstand impact forces of the luggage against said surface in case of sudden braking or even in the event of an accident. For that purpose, rear seats have a rear structure, which supports a padding, which, in turn, is covered by a cover. Said structure is normally made of a metal material and comprises a tubular element and a substantially vertical plate having a peripheral groove, to which the edge of the cover is attached. The tubular element extends in a circular fashion on the front surface of the plate and is foxed to said plate.

Normally, the metal plate is fixed to the tubular element by means of rivets. Generally, a finishing panel made of a plastic material covers the rear surface of the metal plate, so as to cover the rivets and create a better look of the front surface of the luggage compartment.

In the solution described in patent EP2487065B1, which corresponds to the preamble of claim 1, the tubular element is snap-fixed to the metal plate, thus avoiding the use of rivets.

Furthermore, in patent EP2487065B1, the plate of the rear structure is made of a plastic or composite material—and not of a metal material—in order to reduce the weight of the backrest.

If you change the material of the plate, the solutions described above are not suited any longer for the procedure that is normally used to fit the cover on the padding. As a matter of fact, during this procedure, the edge of the cover is fixed to the peripheral groove of the metal plate, while the padding is being compressed; in this way, when the compression is released, the fabric of the cover is automatically stretched, thus substantially avoiding the formation of creases. A plastic material plate has a definitely smaller rigidity compared to one made of a metal material and, therefore, it deforms to a greater extent when the compression is released; due to this deformation, the residual tension of the cover is not sufficient to avoid creases or similar defects.

In other solutions, the cover forms a casing that completely wraps the padding and the structure of the backrest and can be opened, for example through a zip, in order to be then removed from the remaining part of the backrest and, for example, be washed by the user. In this case, the fabric of the casing defines the front surface of the luggage compartment, thus ensuring a definitely good look. However, this solution is relatively expensive, which makes it not suited for medium-low range cars.

SUMMARY OF THE INVENTION

The object of the present invention is to provide a seat backrest, which overcomes the drawback described above in a simple and cost-effective manner and can use a rear plate made of a plastic material, preferably with a shape and sizes that are the same as those of known solutions.

According to the present invention, there is provided a seat backrest as claimed in claim 1.

BRIEF DESCRIPTION OF THE DRAWINGS

The present invention will be best understood upon perusal of the following detailed description of a preferred embodiment, which is provided by way of example and is not limiting, with reference to the accompanying drawings, in which.

DETAILED DESCRIPTION OF THE INVENTION

Figure 1:
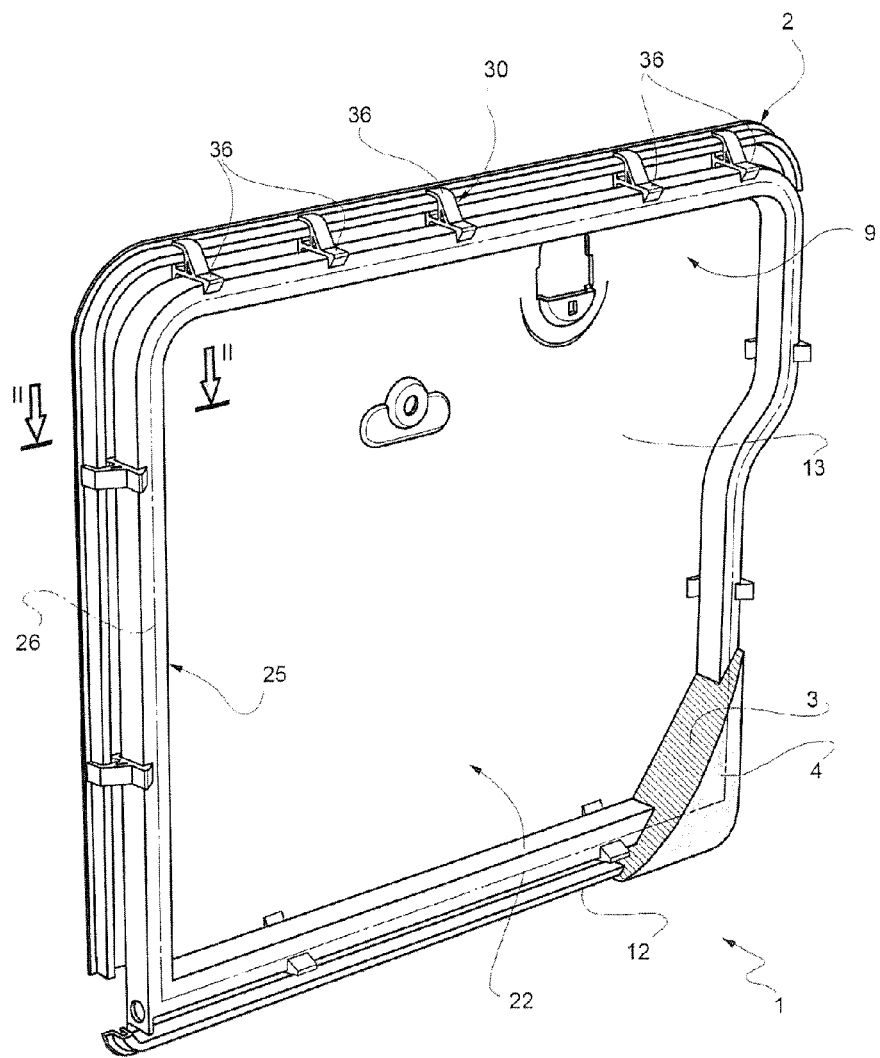
FIG. 1 is a perspective view showing, with parts removed for greater clarity, a preferred embodiment of the seat backrest according to the present invention.

In FIG. 1, number 1 indicates, as a whole, a seat backrest (partially shown), mounted in a last row of seats in a motor vehicle.

The backrest 1 comprises a rear structure 2 and a padding 3, which is supported by the structure in a known manner—not described in detail—and is made, for example, of a foam material. The backrest 1 comprises, furthermore, a cover 4, which is made, for example, of fabric and covers the front and sides of the padding 3.

The structure 2 comprises a plate 9, which is made of a plastic material or of a composite material comprising a plastic material. This composite material, for example, is defined by a fibre-reinforced plastic material. Preferably, the plate 9 comprises a cell-like structure (not shown), for example with closed cells. As an alternative to or in combination with the cell-like structure, the plate 9 can be a multi-layer plate.

The plate 9 has a peripheral edge 12 covered by the cover 4 and comprises an intermediate portion 13 having a rear surface (FIG. 2), which directly delimits (namely, without any additional cover) a luggage compartment (not shown) of the motor vehicle.

Figure 2:
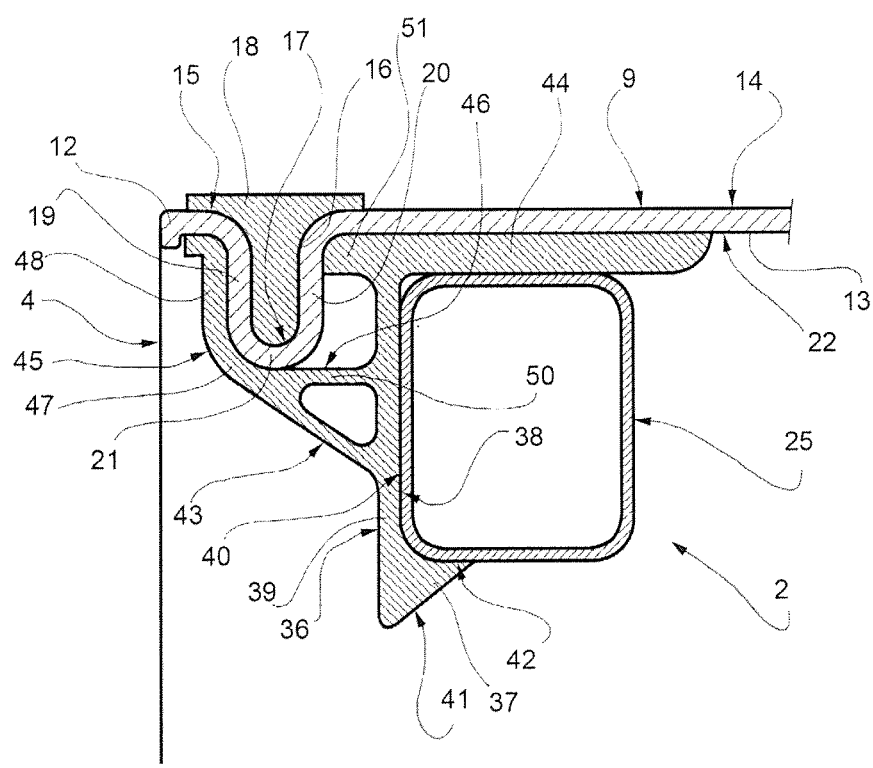
FIG. 2 is a cross section along the section plane indicated by line II-II of FIG. 1 and shows, on a larger scale, a detail of the backrest of FIG. 1.

With reference to FIG. 2, the plate 9 comprises, furthermore, a coupling portion 15, which is arranged along the edge 12 and is fixed to an end 16 of the cover 4, so as to keep the cover 4 itself in a fixed position, where it adheres to the padding 3.

Preferably, the coupling portion 15 has a U-shaped cross section, so as to define a channel 17, which is substantially parallel to the edge 12 and houses the end 16. Preferably, the end 16 remains clamped in a fixed position between the coupling portion 15 and an insert 18, which is also inserted into the cavity 17. In particular, the coupling portion 15 is made up of: a wall 19, which is joined to the edge 12; a wall 20, which is substantially parallel to the wall 19 and is joined to the portion 13; and a curved wall 21, which joins the walls 19 and 20 to one another and defines the bottom of the channel 17.

According to an embodiment that is not shown herein, the coupling portion 15 is provided with a plurality of holding seats or holes to fix, for example through pressure, corresponding buttons or pins that are fixed to the end 16 of the cover 4.

As shown in FIG. 1, the plate 9 has a front surface 22, on which a stiffening frame 25 is arranged. The frame 25 is part of the structure 2 and is at least partially housed in the padding 3. The frame 25 is preferably made of a metal material and consists of one or more elements, which are oblong and extend along an axis 26 that is substantially parallel to the plate 9. In particular, these oblong elements form a ring frame, with the axis 26 that is substantially parallel to the edge 12. Each oblong element is preferably defined by a relative tube, whose cross section has, for example, a rectangular or square outer shape with rounded corners.

The frame 25 is coupled to the plate 9 in a fixed position through a snap-on connecting device 30. Preferably, an adhesive (not shown) is provided, so as to keep the frame 25 in a fixed position in addition to the action of the device 30.

The device 30 comprises a plurality of elastically deformable appendages 36, which are carried by the plate 9, project from the plate 9 on the side of the surface 22, are located in fixed positions, and are spaced apart from one another in a direction that is parallel to the axis 26. As shown in FIG. 2, the appendages 36 end with respective teeth or projections 37 facing the surface 22, so as to define a holding seat 38 engaged by the frame 25.

The appendages 36 comprise respective walls 39, which are arranged next to an outer lateral surface 40 of the frame 25 and are elastically flexible. The free ends of the walls 39 define the teeth 37 and are shaped so as to form suitable bevels or outer fittings 41, which define the surface needed to obtain a parting of the teeth 37 and, therefore, to let the frame 25 into the seat 38, when the frame 25 is pushed towards the surface 22 while being mounted on the plate 9. Before being pushed, the frame 25 is placed on the free ends of the appendages 36 without requiring a special placing equipment, since the appendages 36 themselves take care of centring the frame 25. After the frame 25 has been pushed, namely when the frame 25 substantially reaches the surface 22, the walls 39 elastically snap into their original position and, hence, the teeth 37 hook a front surface 42 of the frame 25, so as to prevent the latter from moving away from the surface 22.

Subsequently, the frame 25 can be further fixed to the plate 9 by means of additional gluing spots or seams (not shown).

According to an aspect of the present invention, the appendages 36 make up part of respective brackets 43, which are defined by pieces that are distinct from the plate 9 and are fixed to the latter before mounting the frame 25.

The brackets 43 are preferably made of a metal material and comprise respective base portions 44, which are at least partially embedded in the plastic material of the plate 9. Preferably, said plastic material is thermomelting and is heated as the base portions 44 are pressed against the plate 9, so as to cause them to be partially embedded therein, which allows the brackets 43 to be fixed, once the plastic material is brought back to room temperature.

Conveniently, the plate 9 is made of a thermoformable material and is subject to a thermoforming process, so as to cause it to assume a desired, not perfectly flat shape, before mounting the frame 25. In this case, the brackets 43 are arranged in the thermoforming mould (not shown) together with a flat blank to be thermoformed, so as to cause the portions 44 to be embedded in the plastic material during the thermoforming process.

According to a further aspect of the present invention, as shown in FIG. 2, the brackets 43 comprise respective stiffening portions 45, which are frontally arranged in the are of the coupling portion 15, namely on the side of the surface 22. The cover 4 is kept stretched after having been fitted on the padding 3 and fixed to the coupling portion 15; due to the tension exerted by the cover 4 and to the relatively high deformability of the plate 9, the coupling portion 15 tends to bend forward, but the portions 45 counter this bending movement, as they are stiffer.

In particular, the portions 45 rest against the wall 19, part of the curved wall 21 and the fillet joining the wall 19 to the edge 12.

According to an embodiment that is not shown herein, the portions 45 are partially embedded in the plastic material of the coupling portion 15.

Advantageously, the portions 45 are made up of respective arms, which project from the appendages 36 towards the edge 12, namely in a direction that is opposite to the seat 38, and are shaped so as to define respective cavities 46, which house or embrace the coupling portion 15. In particular, each arm 45 comprises: a curved portion 47, against which the curved portion 21 rests; a wall 48, which is arranged next to the entire wall 19; and an attachment portion 50, which connects the curved portion 21 to an intermediate portion of the wall 39.

Preferably, the base portions 44 comprise respective ends 51, which are arranged along the fillet joining the wall 20 to the portion 13, so as to also stiffen this area. At this fillet, the ends 51 are rounded, so as not have sharp corners.

Owing to the above, it is apparent that the plate 9 can be made of a plastic material, even if the coupling portion 15 becomes relatively flexible, since the brackets 43 have features that allow them to stiffen the coupling portion 15 itself. At the same time, the solution suggested herein is relative simple, since the brackets 43 are also used to define the device 30 and do not interfere with the design, the size and the shape of the plate 9.

Hence, this solution is relatively light, due to the material with which the plate 9 can be made. At the same time, the features concerning the way in which the cover 4 is held in position and caused to be adherent remain the same, without having to change the method with which the cover 4 is fitted. Furthermore, the performances of the backrest 1 in terms of resistance to the impact of the luggage in case of sudden braking or possible accidents remain the same. Moreover, the frame 25 is snap-mounted on the plate 9, without the need to use a special equipment to correctly position the frame 25 relative to the plate 9. In addition, the solution suggested herein does not force manufacturers to change the constructive features of the frame 25, which, therefore, can be identical to known traditional solutions.

The fact of having a plurality of separate brackets 43, instead of having one single element, allows manufacturers to reduce the quantity of metal material used.

The shape of the brackets 43 could be different from the one described herein, but the one shown in the drawings is optimal in terms of compromise between stiffening of the coupling portion 15, on the one hand, and simplicity, compactness, weight and saving of metal material, on the other hand.

Owing to the above, finally, it is evident that the backrest 1 described and shown herein can be subject to changes and variations that do not go beyond the scope of protection of the present invention, as set forth in the appended claims.

In particular, the brackets 43 can be fixed to the plate 9 in a different fashion from the one described above, for example by means of mechanical elements and/or through glue.

Even the way in which the end 16 of the cover 4 is fixed and the portion 15 is shaped can be different from the solution shown herein, which is provided with the channel 17; for example, there could be provided a plurality of buttons, as mentioned above.

Furthermore, the material of the brackets 43, despite having to be a relatively valuable material, so as to give to the coupling portion 15 a sufficient stiffness, could also be a non-metal material. At the same time, the appendages 36 can have a different shape from the one shown herein, depending on the elasticity of the material chosen for the brackets 43 and depending on the cross section and the size of the elements forming the frame 25.

Finally, some of the brackets 43 that are fixed on the plate 9 could have no appendages 36 and only have the portions 45.

The invention claimed is:

1. A seat backrest for a motor vehicle, the backrest comprising:
    a supporting structure comprising:
        a) a rear plate having a peripheral edge and comprising a coupling portion, which is arranged along at least part of said peripheral edge;
        b) a front frame, which is arranged on said rear plate;
        c) snap-on connecting means, which couple said front frame to said rear plate in a fixed position and comprise a plurality of appendages, which are elastically deformable and are carried by said rear plate in positions that are spaced apart from one another;
    a padding, which is supported by said supporting structure and faces a front surface of said rear plate;
    a cover, which covers said padding and comprises an end, which is fixed to said coupling portion;
    wherein said supporting structure comprises a plurality of brackets, which are fixed to said rear plate and comprise respective stiffening portions, which are arranged at said coupling portion to stiffen said coupling portion; at least some of said brackets comprising said appendages.

2. A seat backrest according to claim 1, wherein said brackets are made of metal.

3. A seat backrest according to claim 1, wherein said rear plate comprises a thermomelting plastic material; said brackets being partially embedded in said thermomelting plastic material.

4. A seat backrest according to claim 3, wherein said rear plate is made of a thermoformable material.

5. A seat backrest according to claim 1, wherein said stiffening portions rest against said coupling portion.

6. A seat backrest according to claim 1, wherein said stiffening portions are at least partially embedded in said coupling portion.

7. A seat backrest according to claim 1, wherein said coupling portion has a U-shaped cross section, so as to define a channel; said stiffening portions being defined by curved arms defining respective cavities housing said coupling portion.

8. A seat backrest according to claim 7, wherein said appendages comprise respective walls, which are arranged next to an outer lateral surface of said front frame and are elastically flexible; said curved arms projecting from an intermediate portion of said walls.

* * * * *